Figure 1:
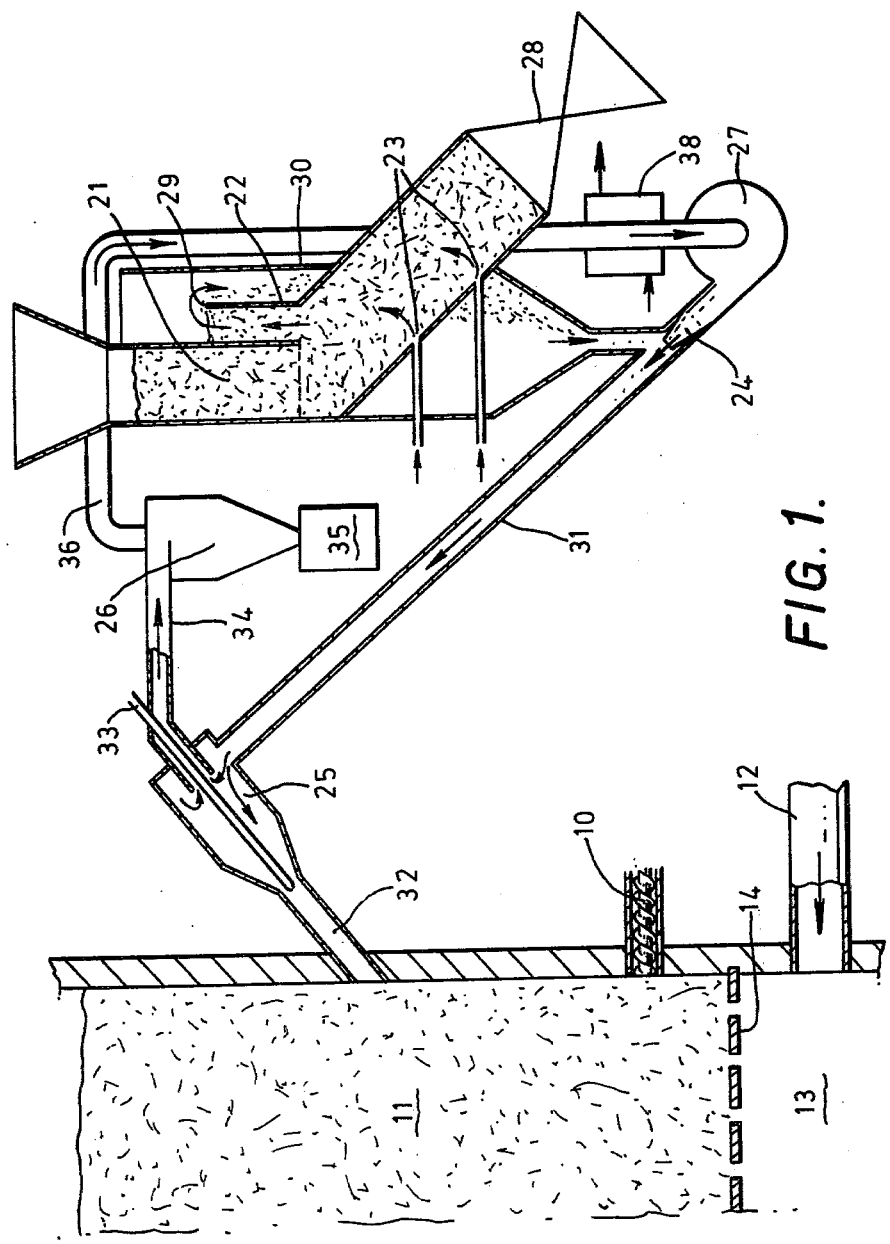

United States Patent [19]

Lyon et al.

[11] 4,276,062

[45] Jun. 30, 1981

[54] FLUIDIZED BED SYSTEMS

[75] Inventors: David Lyon; Gerald Moss, both of Oxford, England

[73] Assignee: The United States of America as represented by the Administrator of the U.S. Environmental Protection Agency, Washington, D.C.

[21] Appl. No.: 798,544

[22] Filed: May 19, 1977

[30] Foreign Application Priority Data

May 21, 1976 [GB] United Kingdom ............... 21162/76

[51] Int. Cl.³ ............................................. B01D 53/12
[52] U.S. Cl. .................... 55/77; 48/DIG. 4; 55/390; 209/139 R
[58] Field of Search .............. 23/277 C, 288 B, 288 S; 48/DIG. 4; 55/34, 77, 181, 390; 209/138, 139 R, 466, 467, 468, 469

[56] References Cited

U.S. PATENT DOCUMENTS

| 1,850,756 | 3/1932 | Lessing | 209/139 R X |
|---|---|---|---|
| 2,396,709 | 3/1946 | Leffer | 209/138 X |
| 2,423,813 | 7/1947 | Lechthaler et al. | 209/139 R X |
| 2,864,763 | 12/1958 | Schulman et al. | 209/138 X |
| 2,959,284 | 11/1960 | Molstedt | 209/138 |
| 3,957,459 | 5/1976 | Mitchell et al. | 209/138 X |

FOREIGN PATENT DOCUMENTS

| 7103975 | 9/1971 | Netherlands | 55/77 |
|---|---|---|---|
| 1336563 | 11/1973 | United Kingdom | 209/138 |

Primary Examiner—Robert H. Spitzer

[57] ABSTRACT

A selected fraction of solid particles having sizes, densities and/or weights in a selected range is separated from a mixture of articles by fluidizing the mixture in a bed using a fluidizing fluid to cause particles including the selected fraction to pass out of the top of the bed; conveying the particles in a conveying fluid to a suitable separator (e.g. a cyclone) wherein the selected particles fraction is separated from smaller, lighter particles; injecting the separated fraction from the separator into a utilization zone (e.g. a fluid bed reactor); entraining other particles in the conveying fluid to another separator (e.g. a cyclone) to produce solids-free conveying fluid which is recirculated for re-use. The original particles mixture may be obtained by separation (e.g. in a cylone) from fluid leaving the utilization zone.

13 Claims, 2 Drawing Figures

FLUIDIZED BED SYSTEMS

The present invention was made in the course of work performed under a contract with the U.S. Environmental Protection Agency and relates to the operation of process zones, such as zones comprised of fluidized bed systems, and more particularly, but not exclusively, to passing particles into a process zone, such as a zone containing a fluidized bed.

Fluidized bed systems are widely used and in the course of their operation, particles are entrained out of the fluidized bed or beds of the systems which comprise a mixture of materials of which some materials may be used or processed again in the fluidized bed(s) and other materials of little further utility or processibility in the bed(s) and may advantageously be discarded or recovered from the fluid bed system. In some fluidized bed operations, particles comprising a mixture of materials of differing utility or processibility in the fluidized beds would advantageously be separated into materials which are worth passing into the fluidized bed and other materials which are not so worth passing into the bed. Such a mixture of materials may or may not have originated or been formed in the fluidized bed system.

In many cases, the different materials have different sizes, weights, specific gravities and/or other fluidization characteristics and these differing characteristics are exploited for the performance of the invention.

In one aspect, the present invention provides a method of supplying a process zone with particles of sizes, weights and densities in a selected range according to their fluidization characteristics in which a mixture of particulate solid materials of different particle size and densities are fluidized by an upwardly passing fluidizing fluid in a vessel having an overflow weir or orifice above its bottom under such fluidizing conditions of superficial velocity of the fluidizing fluid that particles having a fluidization velocity in said fluid greater than a selected superficial velocity sink downwardly in the vessel and particles having a lower fluidization velocity are caused to pass out of the vessel by flow over said weir or through said orifice, recovering the particles which have passed out of the vessel, entraining the recovered particles in a conveying fluid and circulating the conveying fluid and entrained particles to separating means wherein particles having a size not substantially less than a selected size are separated from the conveying fluid, and entraining said thus separated particles in an injecting fluid which injects entrained particles into said process zone.

The process zone may comprise a bed of fluidized solids, and the particles entrained in the injecting fluid may be passed into the fluidized bed. The mixture of particulate solids may be obtained by separation from solids-carrying fluid from the fluidized bed.

The conveying fluid and entrained particles having a size, weight and/or density less than the selected size is preferably circulated to a second separating means, and particles having a size, weight and/or density less than particles separated in the first-mentioned separating means are separated whereby to produce a conveying fluid which is substantially free of particles. The particles separated in the second separating means may be recovered and discarded either for disposal or another use.

At least some of the substantially particles-free conveying fluid may be vented to the ambient environment. Alternatively or in addition, at least some of the substantially particles-free conveying fluid may be recirculated for use in entraining further quantities of recovered particles. Any suitable recirculation means may be employed for this purpose.

Particles which sink in the vessel are preferably recovered from a bottom region thereof, and particles may be introduced into the mixture of particulate solids substantially continuously.

The invention is preferably practiced on a continuous basis, with particles being introduced into said vessel substantially continuously.

In another aspect, the present invention provides apparatus for supplying a process zone with particles of sizes, weights and densities in a selected range, as determined by their fluidization characteristics, said apparatus comprising a vessel for containing a mixture of particulate solid materials of different particle sizes and densities, said vessel having an outlet above the level of its bottom, means for passing a fluidizing gas into the vessel for fluidizing particles in the vessel at a selected fluidization velocity, a chamber for receiving particles which pass out of the outlet, the chamber communicating with a dilute phase conveying conduit, means operative for passing a conveying fluid into one end of the conveying conduit for entraining particles from the chamber, separating means at the other end of the conveying conduit adapted for separating from conveying fluid, entrained particles having a combination of size and density not substantially less than a selected size and density combination, an injection conduit having the separating means at one end and means operative for passing an injecting fluid into said injection conduit for entraining particles separated in said separating means and transporting the entrained particles to the end of the injection conduit at the location of part of the process zone.

The process zone may define a volume for containing a bed of fluidizable solids.

The said vessel may be arranged for receiving a mixture of particulate solids separated from the bed of fluidizable solids.

There may be separating means connected for receiving solids-carrying fluid from the fluidizable solids bed volume and operable to separate particulate solids from said fluid, and conduit means connected for conducting separated particulate solids into said vessel at a level between the bottom and the outlet.

Preferably, there are further separating means connected for receiving conveying fluid and any entrained particles of a size and weight or density less than said selected size, weight or density and for separating from said conveying fluid at least a major portion of said entrained particles.

The apparatus preferably comprises conduit means and fluid circulating means for recirculating conveying fluid to the conveying conduit. The vessel may be provided with a normally closed orifice in or near to its bottom which can be opened to recover or remove from the vessel particles of relatively large size, weight or density which might otherwise tend to accumulate in the vessel.

The invention, in a further aspect, provides the combination of a fluidized bed system and apparatus, as described in the foregoing paragraphs, connected to receive solids-laden fluid leaving the fluidized bed system and for injecting solids having a size, weight, and- /or density not substantially less than said selected size, weight and/or density back into the system.

In one embodiment, the vessel is connected to receive solids which have been entrained out of a fluidized bed in the said chamber. The fluidized bed may be one within which a fuel is partly or fully burned. The fluidized bed material may be inert (e.g. sand, ash, etc.) or chemically active (e.g. containing a metal oxide which may be reduced to metal by the fuel and/or employed to fix components of the fuel, such as sulphur, vanadium and/or sodium, which are undesirable in the partly to full burned gaseous products. The fuel may be a gaseous, liquid or solid fuel or any mixture thereof.

Figure 2:
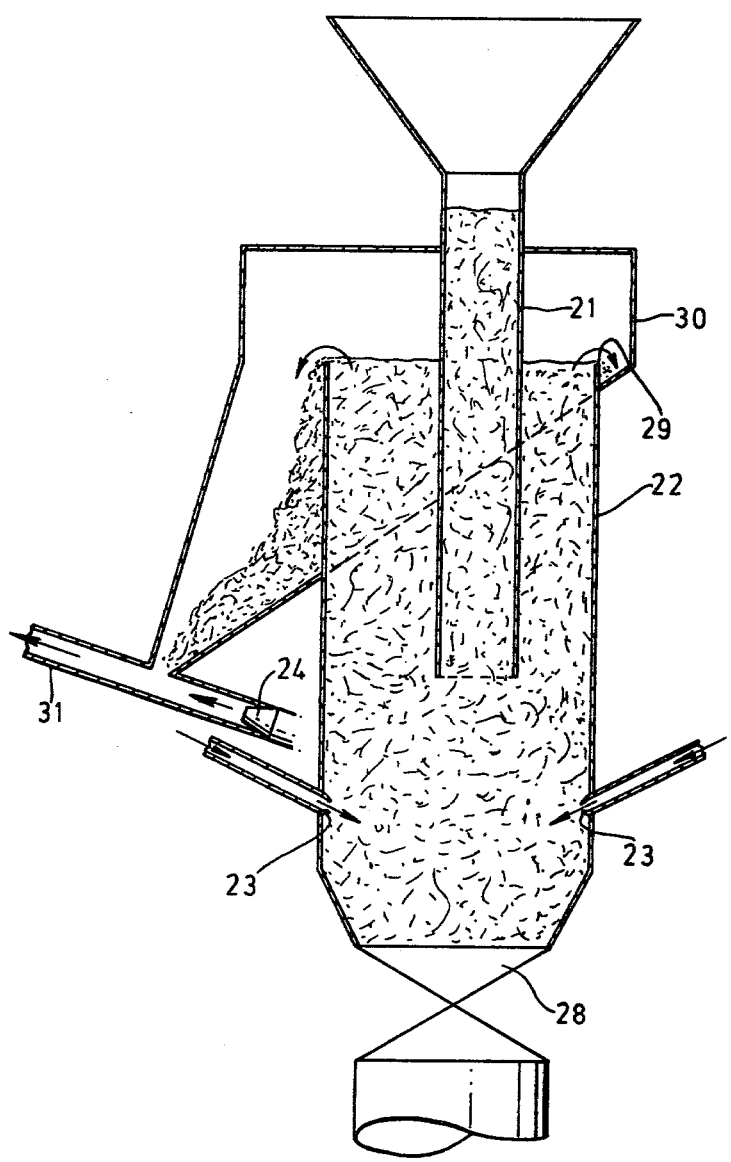

Embodiments of the invention are now described, by way of non-limitative examples and with reference to the accompanying drawings in which FIG. 1 illustrates schematically, part of a fluidized bed coal gasification plant and FIG. 2 shows an alternative construction of some of the parts illustrated in FIG. 1.

FIG. 1, crushed coal, either alone, or in a slurry with a heavy low-value hydrocarbon oil, is passed by a screw feed 10 (or other suitable feeding device) into a bed 11 containing particles of calcium oxide (e.g. decarbonated limestone or dolomite) and ash which is fluidized by air passed upwardly through the bed from air trunking 12, plenum 13 and distributor 14. The air is supplied at a rate providing about 20% of the stoichiometric oxygen equivalent of the fuel whereby the fuel is converted to a hot, fuel gas at a bed temperature of from 800° to 970° C. Sulphur from the fuel reacts with the calcium oxide of the bed to form calcium sulphide and the fuel gas leaving the top of the bed is relatively free of sulphur but contains (inter alia) tars and other heavy cracked products and entrained solids comprising calcium oxide- and sulphide-containing particles, ash and solid fuel residues. It is desirable to remove the entrained solids from the fuel gas, as far as possible, and to this end, the fuel gas is passed through a cyclone system (not shown). The cyclone system removes substantially all solid material in the conventional manner. Some of the solids thus separated from the resultantly substantially solids-free fuel gas will contain fuel values as well as CaO-containing materials and it is desirable to return both of these components to the bed 11 for further use in the interest of operational efficiency. In order to do this, a dipleg 21 extends downwardly from the cyclone system and terminates below the top of a vessel 22, filling and continuously replenishing the latter with separated solids from the cyclone system.

The sides of the vessel 22 beneath the dipleg 21 are sloping so that at least the lower part of the sides of the vessel are not directly under the open end of the dipleg 21. An inert fluidizing gas, such as flue gas obtained by burning the hot fuel gas produced in the bed 11, is passed into the vessel 22 from jets or orifices 23 in the lower part of the sides at locations which are not directly under the end of the dipleg so that the fluidizing gas causes mild fluidization of the solids in the vessel 22, the mild fluidization causing segregation of the solids according to their densities, sizes and fluidization velocities.

Because the fluidizing gas is injected at locations which are not under the open end of the dipleg 21 and because lateral gas mixing is relatively poor in fluidized beds, there is relatively little tendency for fluidizing gas to pass into the dipleg 21: the downward flow of particles through the dipleg 21 is therefore substantially uninhibited, while the head of particles in the dipleg 21 above the head of particles in the vessel 22 also serves to prevent fluidizing gas passing up the dipleg 21 to the cyclone system. The densest and largest solids (e.g., solid carbon lumps produced by carbonization of tarry material and fused ash) tends to sink in the vessel 22 and can be removed periodically therefrom by opening the normally closed valve 28 periodically. Lighter and smaller particles, such as coal and coke fines, ash and lime-containing particles, flow over the top lip 29 of the vessel 22 (which lip 29 thereby serves as an overflow weir) and are received in a surrounding chamber 30 which is closed at the top and open at its conical bottom to a conveying conduit 31. The conduit 31 is preferably upsloping towards the bed 11 and a circulation fan 27 passes a jet of inert gas (e.g. cool flue gas) via jet nozzle 24 into the lower end of the conduit 31 adjacent to the bottom opening of the chamber 30 so that solids are entrained in the gas and conveyed up the conduit to a cyclone 25. The cyclone 25 is so designed that it will separate from the entraining air stream substantially only those entrained particles having a relatively coarse size (e.g. at least 300 microns).

These coarse particles will comprise much of the solid fuel material and lime-containing material which can be re-used in the bed 11. The separated coarse particles are injected into the bed 11 via line 32 by an injection gas stream (e.g. flue gas) passing to the solids-receiving part of the cyclone 25 from a supply line 33.

The entraining gas stream leaves the cyclone 25 via line 34 and passes to a second cyclone separator 26 which is chosen to remove as much as possible of the remaining fine solids, these being received in a receptacle 35 for another use or to be discarded. The fine solids comprise mainly ash and lime which, if not removed from the system so far described, would build up therein and eventually reduce the efficiency of the main cyclone system receiving fuel gas from the bed 11. Moreover such fines would deposit on the walls of conduits which carry fuel gas, thereby constricting the flow area through the conduits.

The entraining gas leaves cyclone 26 via conduit 36 and is relatively free of fine solids. It may be discharged to atmosphere, but is more preferably recirculated to the circulation fan 27 for re-use after being cooled in heat exchanger 38 to a temperature sufficiently low to avoid damage to the fan 27.

The system of the invention reduces the dust load on the main hot gas cyclone and ducts associated therewith, while providing a way of reintroducing to the bed 11, at any convenient location, useful solid materials which have been elutriated out of the bed without reintroducing significant amounts of ash which, in the system described, tends to dilute and react with lime thereby reducing its availability for fixing sulphur.

Moreover, because the dipleg 29 is continuously drained, the load on the main hot gas cyclone is reduced and its efficiency may be maintained at an increased level and its size reduced, in relation to a system not in accordance with the invention. It is to be noted that the operation of the system of the invention involves no valves (other than those employed for periodic solids removal from the vessel 22 (valve 28) and receptacle 35).

A further advantage arising from the invention is that the dipleg 21 may have virtually any convenient vertical length and that the cyclone system that it drains may accordingly be located at relatively low heights without diminishing the efficiency of the cyclone system. In the past, the weight of the head of solids has provided a seal to maintain the reduced internal pressure in the cyclone(s) of the cyclone system and the height of the dipleg necessary to provide an adequate seal has necessitated locating the cyclone(s) at sometimes inconveniently great heights. By means of the invention, a relatively short dipleg 21 may be employed since the dipleg pressure at vessel 22 is supplemented by further pressure increments added at the orifices 23, nozzle 24 and at the eductor end of line 33 in cyclone 25. The closed solids circulation system is thus under sufficient pressure to seal the cyclone system and the latter may therefore be located at virtually any height which is convenient for supplying the hot fuel gas leaving the cyclone system to (e.g.) a burner. This may provide a further benefit in that the distance between the cyclone system and the burner may be reduced thereby reducing the length of relatively expensive refractory-lined conduit which must be employed to convey the hot fuel gas from the cyclone system to the burner.

In the alternative construction of FIG. 2, the dipleg 21 terminates in a vessel 22 which is in the form of a hollow cylinder having vertical cylindrical sides terminating in an overflow weir 29 at the top. The vessel 22 and the dipleg 21 may be substantially co-axial. The chamber 30 is cylindrical at its top where it surrounds and upwardly closes the vessel 22, but tapers downwardly towards the conveying pipe 31 at angles selected to promote ease of downward flow of the solids which overflow the weir 29.

Fluidizing gas is passed into the vessel 22 from jets or orifices 23 so that the solids in the vessel 22 are so fluidized that heavy and/or large and/or dense particles sink to the bottom from where they can be discarded via dump valve 28. The head of solids in the dipleg 21 above the level of particles in the vessel 22 provides a pressure in the dipleg 21 exceeding the pressure in the vessel 22 so that the solids in dipleg 21 substantially seal the dipleg and substantially prevent the passage of fluidizing gas upwardly from the vessel 22 into the cyclone system via the dipleg 21.

The activity of the particles in the bed 11 for fixing sulphur is maintained by continuously transferring CaS-containing particles from one region of the bed 11 to one region of a regenerator (not shown) wherein the particles are fluidized in an upwardly moving stream of air at temperatures 800° to 1250° C., the following (empirical) reactions taking place:

$$2CaS + 3O_2 \rightarrow 2CaO + 2SO_2 \quad (1)$$

$$CaS + 2O_2 \rightarrow CaSO_4 \quad (2)$$

$$3CaSO_4 + CaS \rightarrow 4CaO + 4SO_2 \quad (3)$$

Provided the reaction conditions are appropriately controlled, the main reaction products are $SO_2$ and CaO. The $SO_2$ is released from the regenerator and the regenerated CaO-containing particles are transferred from a second region of the regenerator to a second region of the bed 11.

Although the invention has been described with specific reference to the gasification (part combustion) of fuel, it can also be employed when a fuel is completely burned in the bed 11. The fuel-sulphur is then fixed as $CaSO_4$ by reaction with the lime, substantially sulphur-free flue gas thus being obtained, and the $CaSO_4$ is converted back to CaO in a regenerator by fluidization in a non-homogeneous atmosphere which is preferably reducing on a nett basis, but oxidising in part of the regeneration bed. Details of the fluid bed gasification and combustion process adverted to above will be found in U.K. Patent specifications Nos. 1183937 and 1336563.

What we claim is:

1. A method of supplying a process zone with particles of sizes, weights and densities in a selected range according to their fluidization characteristics comprising introducing a mixture of particulate solid materials of different particle sizes and densities into a bed in a vessel; fluidizing said mixture by an upwardly passing fluidizing fluid in said vessel, said vessel having an overflow weir or orifice above its bottom which weir or orifice limits the maximum level of the top of the bed, under such fluidizing conditions of superficial velocity of the fluidizing fluid that particles having a fluidization velocity in said fluid greater than a selected superficial velocity sink downwardly in the vessel and particles having a lower fluidization velocity are caused to pass out of the vessel by flow over said weir or through said orifice; recovering the particles which have passed out of the vessel; entraining the recovered particles in a conveying fluid and circulating the conveying fluid and entrained particles to separating means wherein particles having a size not substantially less than a selected size are separated from the conveying fluid; and entraining said thus separated particles in an injecting fluid which injects entrained particles into said process zone.

2. A method according to claim 1 in which the process zone contains a bed of fluidized solids and in which particles entrained in the injecting fluid are passed into the bed.

3. A method according to claim 2 in which the mixture of particulate solid materials is obtained by separation from solids-carrying fluid from the fluidized bed.

4. A method according to claim 1 further comprising circulating conveying fluid and particles entrained therein of sizes and densities not substantially less than the selected size and density to a second separating means, and therein separating particles of a size smaller than particles separated in the first-mentioned separating means whereby to produce a conveying fluid which is substantially free of particles.

5. A method according to claim 4 in which at least some of the substantially particle-free conveying fluid is recirculated for use in entraining further quantities of recovered particles.

6. The method of claim 1 wherein the fluidizing fluid is introduced into said vessel non-coaxially with said mixture.

7. Apparatus for supplying process zone equipment with particles of sizes, weights and densities in a selected range, as determined by their fluidization characteristics, said apparatus comprising a vessel for containing a bed comprising a mixture of particulate solid materials of different particle sizes and densities, said vessel having an outlet above the level of its bottom, said outlet serving to limit the maximum level of the top of said bed, means for passing a fluidizing gas into the vessel for fluidizing particles in the vessel at a selected fluidization velocity, a chamber for receiving particles which pass out of the outlet, the chamber communicating with a dilute phase conveying conduit, means operative for passing a conveying fluid into one end of the conveying conduit for entraining particles from the chamber, separating means at the other end of the conveying conduit adapted for separating from conveying fluid, entrained particles having a combination of size and density not substantially less than a selected size and density combination, an injection conduit having the separating means at one end and means operative for passing an injecting fluid into said injection conduit for entraining particles separated in said separating means and transporting the entrained particles to the end of the injection conduit at the location of part of the process zone equipment.

8. Apparatus according to claim 7 in which the process zone equipment defines a volume for containing a bed of fluidizable solids and said vessel is arranged for receiving a mixture of particulate solids separated from solids-carrying fluid from the bed of fluidizable solids via first conduit means.

9. Apparatus according to claim 8 wherein said first conduit means comprises process separating means connected for receiving solids-carrying fluid from the fluidizable solids bed and operable to separate particulate solids from said fluid, and second conduit means connected for conducting separated particulate solids from said separating means into said vessel at a level between the bottom and the outlet.

10. The apparatus of claim 9, wherein said vessel slopes from the perpendicular and said means for passing a fluidizing gas into the vessel enter said vessel non-coaxially with respect to said second conduit means.

11. Apparatus according to claim 7 comprising further separating means connected for receiving conveying fluid and any entrained particles therein of a size and weight less than said selected size and weight and for separating from said conveying fluid at least a major portion of said entrained particles.

12. Apparatus according to claim 7 comprising circulating means for recirculating at least some conveying fluid to the conveying conduit.

13. The combination of a fluidized bed system and apparatus according to claim 7, said apparatus being connected by first conduit means to receive solids-laden fluid leaving the fluidized bed system and by said injection conduit for injecting solids having a size and/or weight not substantially less than a selected size and/or weight back into the fluidized bed of the system.

* * * * *